United States Patent [19]

Hunt

[11] Patent Number: 5,106,243
[45] Date of Patent: Apr. 21, 1992

[54] PORTABLE MACHINE TOOL

[75] Inventor: Christopher C. Hunt, Newberg, Oreg.

[73] Assignee: Climax Portable Machine Tools, Inc., Newberg, Oreg.

[21] Appl. No.: 590,240

[22] Filed: Sep. 28, 1990

[51] Int. Cl.⁵ .................................................. B23C 1/20
[52] U.S. Cl. ................................... 409/178; 51/241 S; 144/2 D; 408/234
[58] Field of Search ............... 409/175, 178, 181, 182, 409/191, 197, 199; 125/4; 408/88, 234; 51/241 S; 144/2 D

[56] References Cited

U.S. PATENT DOCUMENTS

| | | |
|---|---|---|
| 1,520,219 | 12/1924 | Barnes . |
| 2,283,338 | 5/1942 | Pegard ..................... 408/88 |
| 2,619,880 | 12/1952 | Hosea ...................... 90/17 |
| 2,660,096 | 11/1953 | Morton ..................... 409/178 |
| 3,138,998 | 6/1964 | Ivan ........................ 409/178 |
| 3,382,768 | 5/1968 | Mount ...................... 409/178 |
| 3,517,576 | 6/1970 | Hilty et al. ............... 409/132 |
| 3,596,558 | 8/1971 | Rydell ..................... 409/178 |
| 4,022,106 | 5/1977 | Kile ........................ 90/12 R |
| 4,923,343 | 5/1990 | Silk ........................ 409/179 |

FOREIGN PATENT DOCUMENTS

| | | | |
|---|---|---|---|
| 1110412 | 2/1956 | France ............... 51/241 S |
| 0021208 | 2/1982 | Japan ................ 408/234 |

OTHER PUBLICATIONS

"Master Portable Machine Tools" catalog, Master Machine Tools, Inc., South Hutchinson, Kan., 1986.

Primary Examiner—Z. R. Bilinsky
Attorney, Agent, or Firm—Dellett, Smith-Hill and Bedell

[57] ABSTRACT

A portable machine tool includes a bed and a cantilevered ram mounted for movement in a longitudinal direction along the ways thereof. A dovetail slide on a side of the ram movably supports a rotatable spindle unit capable of machining in the transverse direction completely crossways of the bed.

18 Claims, 5 Drawing Sheets

PORTABLE MACHINE TOOL

BACKGROUND OF THE INVENTION

The present invention relates to a portable machine tool and particularly to a portable machine tool for translating a milling cutter in three dimensions without restriction in travel crossways of the machine tool.

Ram type machine tools are characterized by triaxial positioning of a milling cutter. However, travel of the machining head can be somewhat restricted in one or more dimensions. A ram type milling machine conventionally comprises a longitudinal bed along which a carriage travels and a ram mounted on the carriage by means of a cross slide. A vertically movable machining head is disposed at one end of the ram for positioning in X, Y and Z directions in order to machine a desired surface. Although the ram can be cantilevered outwardly a substantial distance from the carriage, nevertheless the machining head is incapable of machining a surface completely across the machine tool bed from one side thereof to the other since the ram is mounted for transverse movement on the carriage and also because the machining head usually depends from one end of the ram. Therefore, machining is normally carried out entirely on one side of the longitudinal bed. This limitation can be of disadvantage, especially in the case of portable machine tools where it is desirable to mount the machine bed on one of two parallel surfaces for the purpose of machining the opposite parallel surface. One example relates to parallel press platens wherein a limited space is available for mounting the machine tool bed on one platen for machining the opposite platen.

SUMMARY OF THE INVENTION

In accordance with the present invention in a particular embodiment thereof, a machine tool comprises an elongated bed adapted for mounting on a horizontal surface and provided with a dovetail slide or guideway along which a saddle or carriage block is movable. A ram which is fixedly mounted on the carriage block is cantilevered outwardly from the bed in a transverse direction and is also provided with a dovetail slide or guideway on one side thereof for receiving a saddle carrying a vertically positionable spindle unit. The spindle unit is movable transversely along the entire length of the ram substantially from one end thereof to the other and therefore can machine completely across the bed without interference. The spindle unit can be oriented such that the machine tool taper for carrying a milling cutter is positioned upwardly whereby the machine tool bed can be mounted on a first parallel surface for machining an opposite parallel surface. The aforementioned ram is remountable on its carriage block at various transversely cantilevered positions, or can be rotated 90 degrees or 180 degrees either for machining off one end of the bed or for locating the spindle unit at the relatively opposite side of the ram whereby machining can be carried out up to the limits of the bed plate and beyond in either longitudinal direction.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

DETAILED DESCRIPTION

Figure 1:
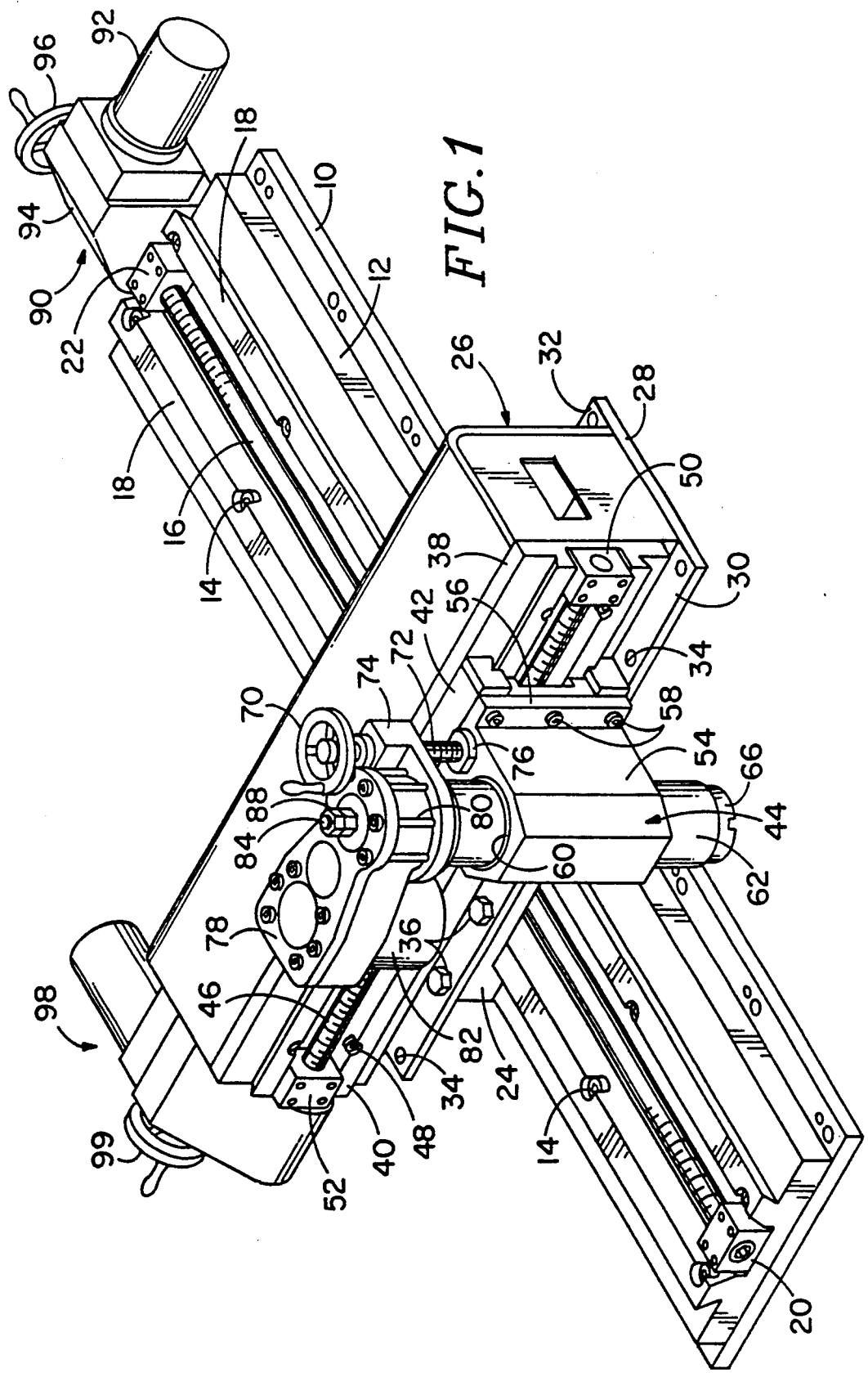
FIG. 1 is a perspective view of a portable machine tool of the ram type in accordance with the present invention.
Figure 2:
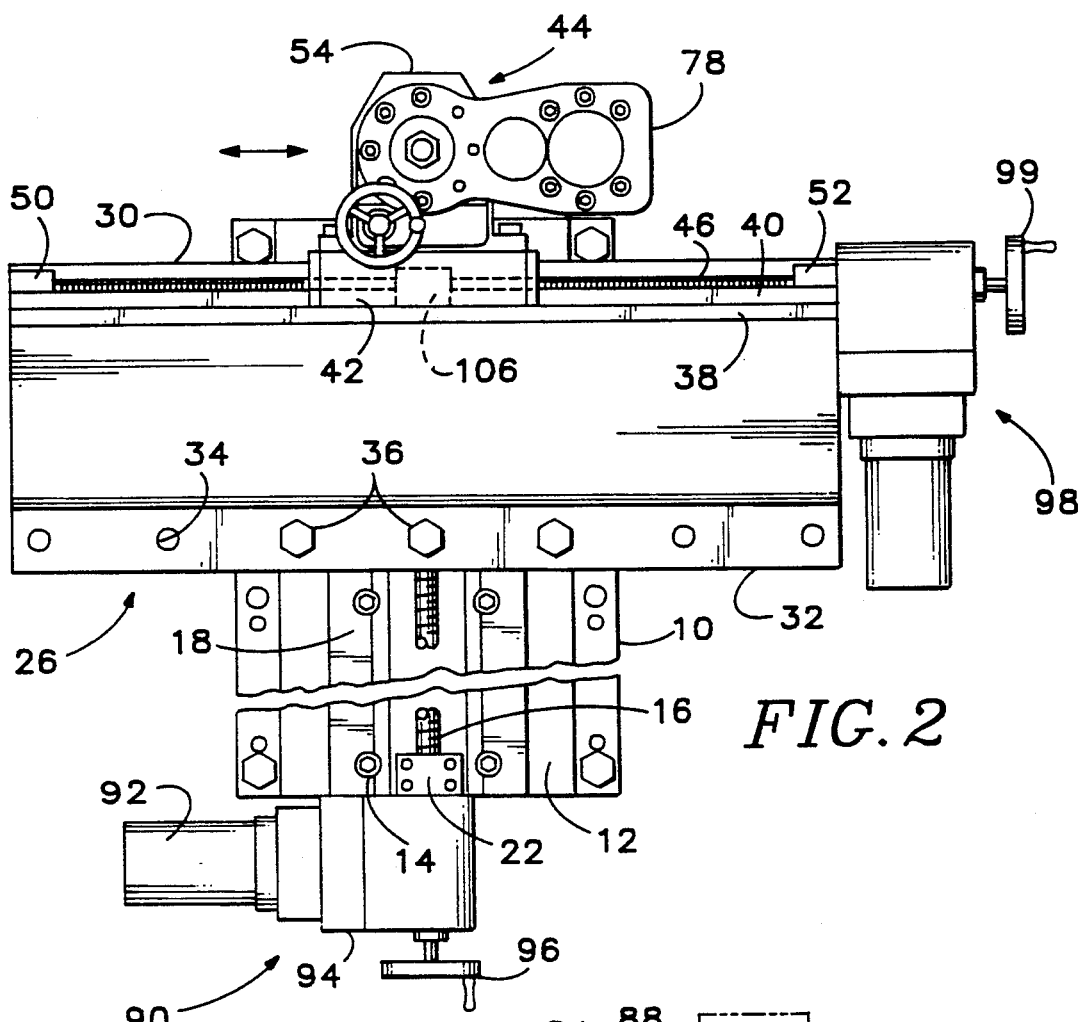
FIG. 2 is a top view of the FIG. 1 machine tool.

Referring to the drawings and particularly to FIGS. 1 through 4, a portable machine tool in accordance with the present invention includes a bed plate or base plate 10 adapted for mounting in the field, e.g. upon a component of the work to be machined, said bed plate supporting a bed 12 incorporating a dovetail slide 18 extending substantially along the entire length of the bed plate. The bed 12 is anchored to the bed plate by means of screws 14. The bed is elongated in a first or longitudinal direction and carries a lead screw 16 disposed centrally therealong between opposite components of the dovetail slide, the lead screw having journaled ends rotatably mounted in bearing blocks 20 and 22 disposed respectively at the extreme left end and the extreme right end of the bed. The ends of the lead screw are also socketed to receive a drive means such as a handwheel or an automatic feed unit via the distal ends of the bearing blocks.

Figure 3:
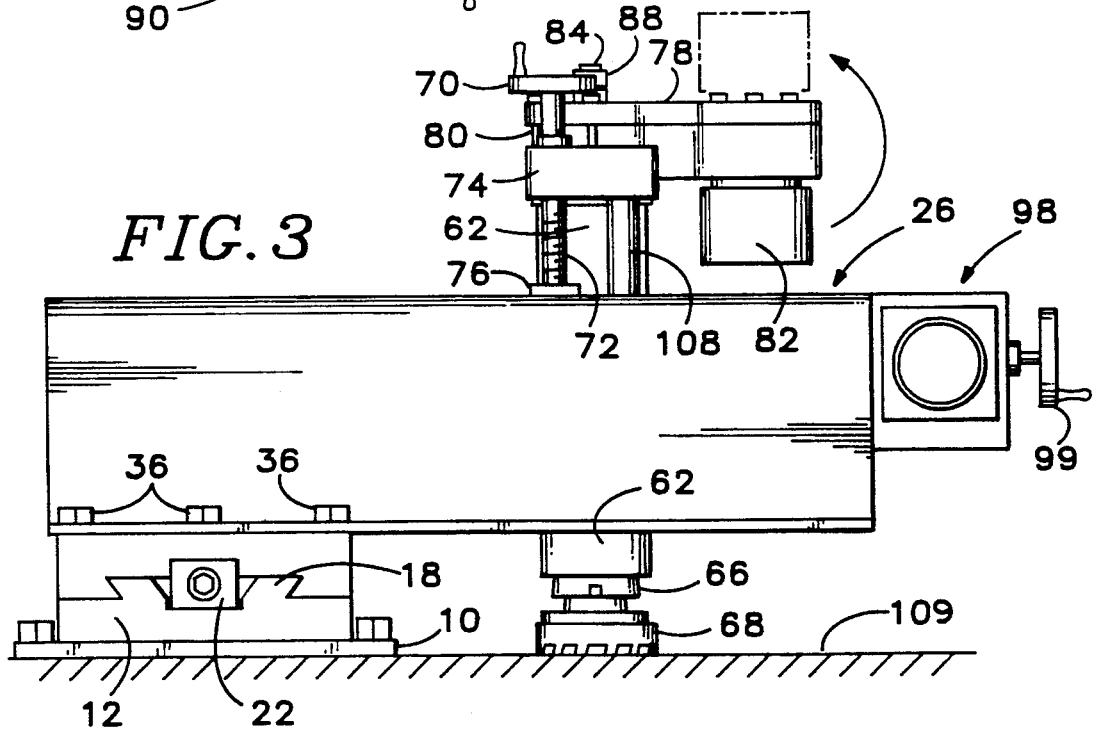
FIG. 3 is a right end view of the machine tool in accordance with the present invention having its ram member cantilevered rearwardly.
Figure 4:
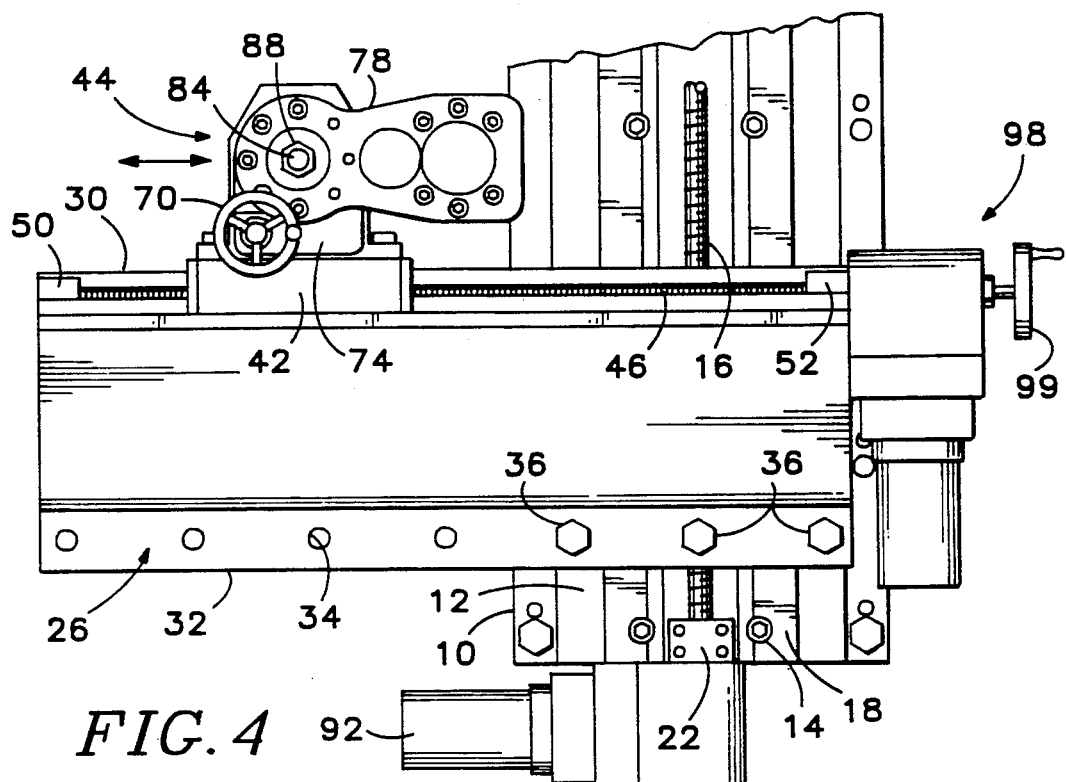
FIG. 4 is a top view of the machine tool having its ram member cantilevered forwardly of the machine tool bed.

Movable along dovetail slide 18 in aligned relation therewith is a mating carriage block 24 upon which ram 26 is fixedly mounted. The lead screw 16 threadably engages carriage block 24 for the purpose of driving the carriage block and ram 26 along slide 18. As can be seen from the drawings, the ram 26 extends in a transverse direction and may be cantilevered outwardly from the bed 12 to a considerable extent on one or both sides of the bed. FIG. 3 illustrates the ram fully cantilevered rearwardly while FIG. 4 shows the ram cantilevered completely forwardly. The ram 26 comprises a heavy gauge rectangular metal housing secured to a base plate 28, the latter defining horizontal flanges 30 and 32 extending outwardly on either side of the ram. The flanges 30 and 32 are provided therealong with a plurality of spaced apertures 34 for receiving bolts 36 adapted to engage threaded apertures in carriage block 24 and attach the ram to the carriage block. It will be noted there are more apertures than there are bolts, i.e., in overhanging portions of the flanges, for providing a choice in positioning the ram on the carriage block.

Secured by machine screws 48 to one side of ram 26, the left side in the embodiment illustrated in FIG. 1, is a bed plate 38 incorporating a second dovetail slide 40 extending the full length of ram 26. Received upon dovetail slide 40 is a mating saddle member 42 adapted for carrying a spindle unit 44 substantially all the way along the length of slide 40, i.e., in the transverse axis of the machine tool from one end of ram 26 to the other completely across bed 12. The saddle member 42 is driven along slide 40 by means of lead screw 46 centrally disposed between the ways of the slide and having journals at either end received respectively in a bearing block 50, attached to bed plate 38 at the forward end of the ram, and a bearing block 52, attached to bed plate 38 at the rearward end of the ram. The lead screw is provided with socket members accessible respectively forwardly and rearwardly through the bearing blocks for the purpose of rotating the lead screw 46. Lead screw 46 engages threaded block 106 forming part of saddle member 42.

The spindle unit 44 comprises a quill clamp 54 having vertical flanges 56 that are provided with apertures for receiving screws 58 suitable for engaging saddle member 42 whereby the spindle unit can be disposed in an upright position as illustrated in FIGS. 1 through 4. The quill clamp has a cylindrical recess 60 within which quill 62 is movable. The quill in turn supports rotatable machine tool taper 66 adapted at its lower extremity to carry milling cutter 68. The quill 62 slides within the quill clamp in order to position the milling cutter vertically under the control of Z axis handwheel 70, the latter being removably connected to a vertical adjusting screw 72. Vertical adjusting screw 72 turns in a bearing provided in L-shaped flange 74 secured to the quill 62, and also engages threaded member 76 at the top of the quill clamp whereby rotation of the handwheel 70 will move quill 62 and milling cutter 68 upwardly or downwardly to a selected machining location. Spindle gear box 78 is secured to the flange 74 by means of bolts 80 so as to extend radially outwardly from quill 62 where it carries a hydraulic motor or other motor 82, energized by means not shown, for rotating machine tool taper 66. The taper 66 is supported via a long drawbolt 84 held at the top of the gear box by nuts 88. The taper is rotated via shaft means within quill 62 driven from gear box 78, the drawbolt 84 extending axially through such shaft means. As illustrated in FIG. 3, a torque column 108 is also secured to flange 74 and is slidably received in quill clamp housing 54. This torque member prevents undesired turning of flange 74 about the axis of quill 62 thereby avoiding binding of adjusting screw 72.

In the case of the embodiment of FIGS. 1–4 an automatic feed unit assembly 90 is mounted at the right hand end of the bed for rotating lead screw 16. The feed unit 90 is secured to bearing block 22 and the end of the bed 12 where it is provided with a rotatable shaft (not shown) for engaging the socketed end of the lead screw in bearing block 22. The feed assembly 90 suitably includes a drive motor 92 and a gear box 94 coupling the output shaft of the motor to the lead screw. A handwheel 96 is also provided for manual rotation. Alternatively the handwheel is engageable directly with the socket end of the lead screw without requiring the automatic assembly should only manual advance of the lead screw be desired. The feed assembly 90 can instead be mounted at the left hand side of the bed, i.e., at bearing block 22, should it be more convenient to do so in a particular instance where clearance is lacking at the right end. Also, the feed unit 90 is mountable in 90 degree increments, i.e., it may be rotated about the axis of the lead screw and mounted to four different angular positions.

A feed unit assembly 98 is illustrated as attached to the rear of bed plate 38 and particularly to bearing block 52 for imparting rotation to lead screw 46. The latter feed unit, which corresponds in mechanical detail to unit 90, is alternatively mountable at the front of ram 26 whereby alternatively to engage the end of the lead screw 46 within bearing block 50. Like unit 90, unit 98 is also positionable at 90 degree increments about the axis of lead screw 46, e.g. for avoiding a structural member or the like in an individual machining operation. It incorporates, or may be replaced by, a handwheel 99.

Figure 5:
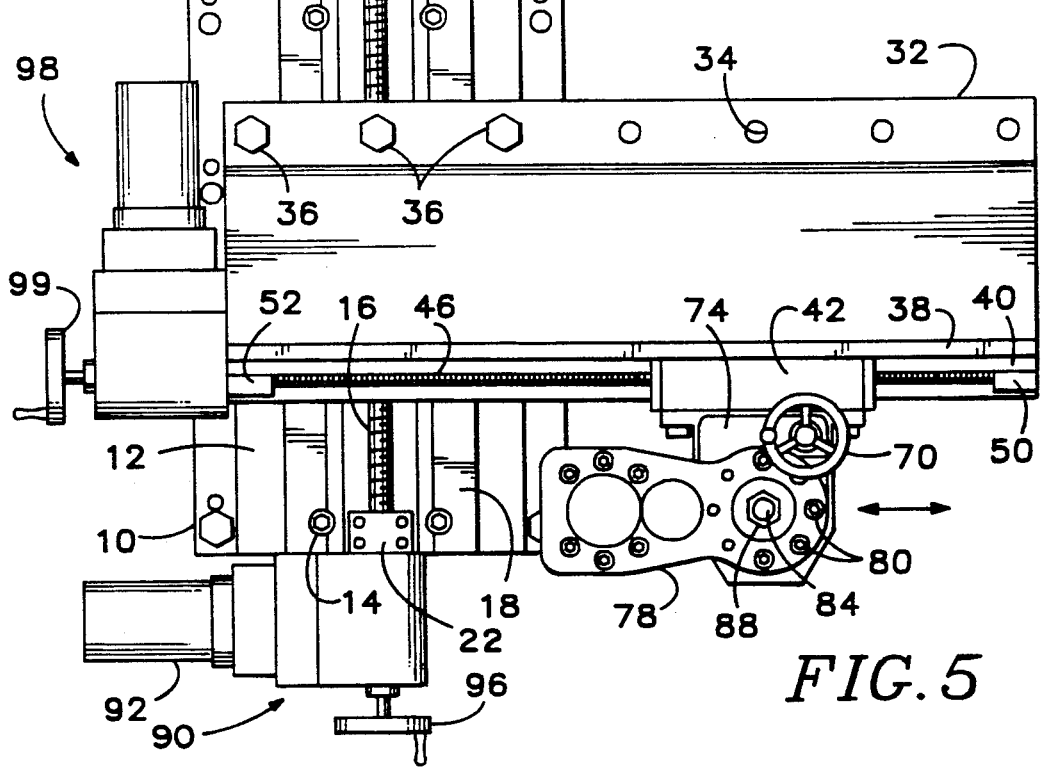
FIG. 5 is a top view of the machine tool according to the present invention having the ram thereof reversed by 180 degrees.
Figure 6:
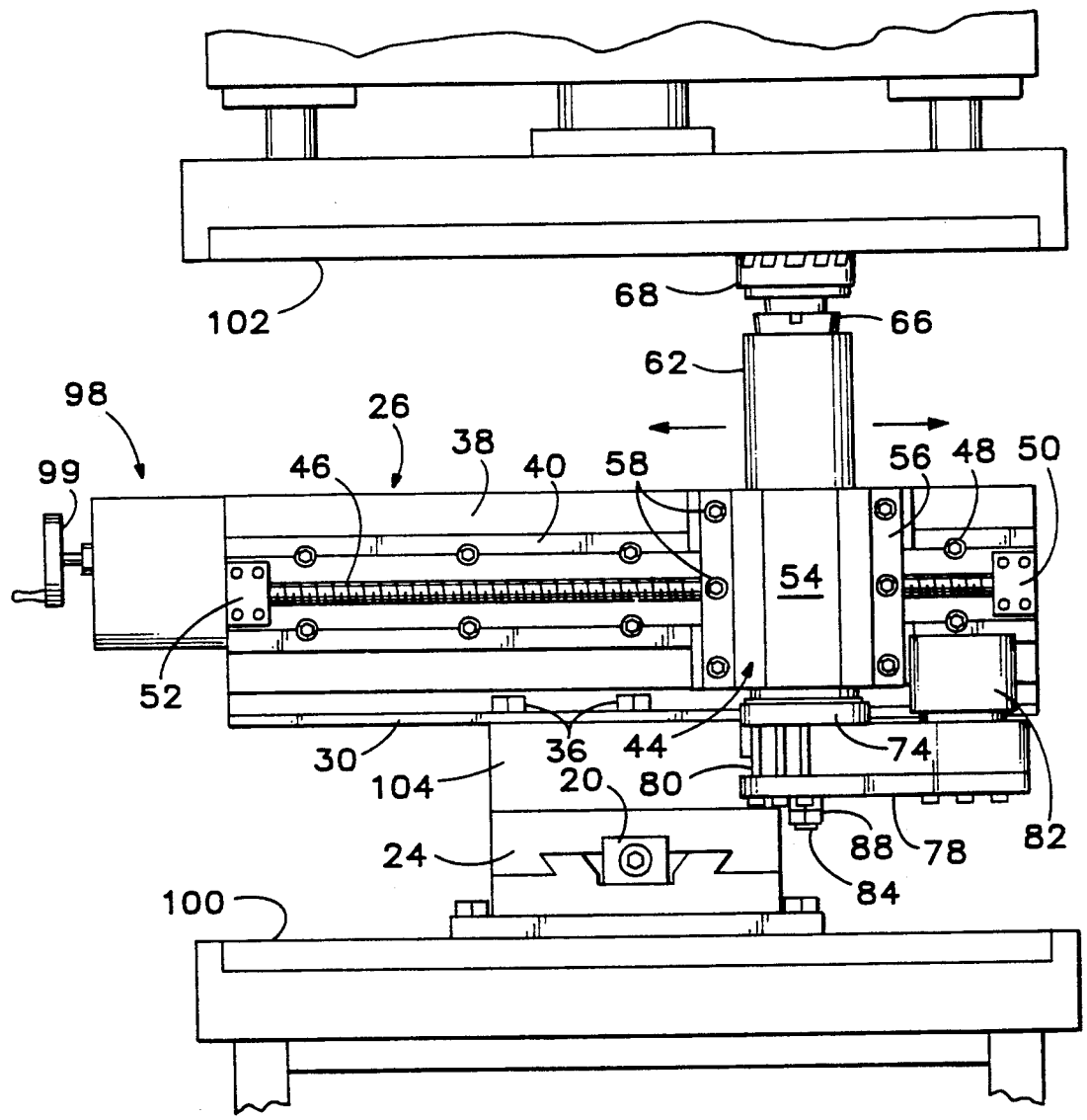
FIG. 6 is a left end view of the machine tool, but illustrating mounting thereof between press platens with its spindle unit reversed.

An advantageous use of the machine tool according to the present invention relates to the machining of a horizontal surface, for example a press platen, from an adjoining horizontal surface such as an opposing press platen when it is desired the two surfaces be substantially parallel. As hereinbefore mentioned, the bed plate 10 is adapted for mounting on a particular work surface from which machining is to be accomplished and for this purpose the bed plate is tack welded or bolted to such surface. In the illustration of FIG. 6 the bed plate is shown mounted on a press platen 100 for the purpose of machining the surface of parallel press platen 102, and in this instance the spindle unit 44 is reversed by 180 degrees from the position shown in FIGS. 1 and 2 such that milling cutter 68 is supported upwardly to machine the surface of platen 102. In order to reverse the spindle unit as shown, the screws 58 are loosened and the spindle unit is re-installed upside down. In most cases it is appropriate also to reposition ram 26 by loosening bolts 36 and raising the ram unit for inserting spacer block 104 having the same longitudinal and transverse dimensions as carriage block 24. Bolts 36 are replaced, for example, with longer bolts extending through apertures in block 104 for engaging left and right flanges of the ram in its upraised position. It will be observed that the spindle unit is translatable substantially the whole length of ram 26, i.e., from one side of bed 12 to the opposite side of bed 12, including one or more cantilevered outward positions along the ram where the spindle unit is supported in completely cantilevered outward relation to the bed. It should be noted in this connection that the dovetail slide 40 on bed plate member 38 extends beyond bed 12 by a distance greater than the length of saddle member 42 along ram 26 (see FIGS. 4 and 5), either to one side or the other of the bed 12 or both sides of bed 12 depending upon the particular mounting of ram 26, thereby enabling an appreciable range of machining in the transverse direction.

Figure 7:
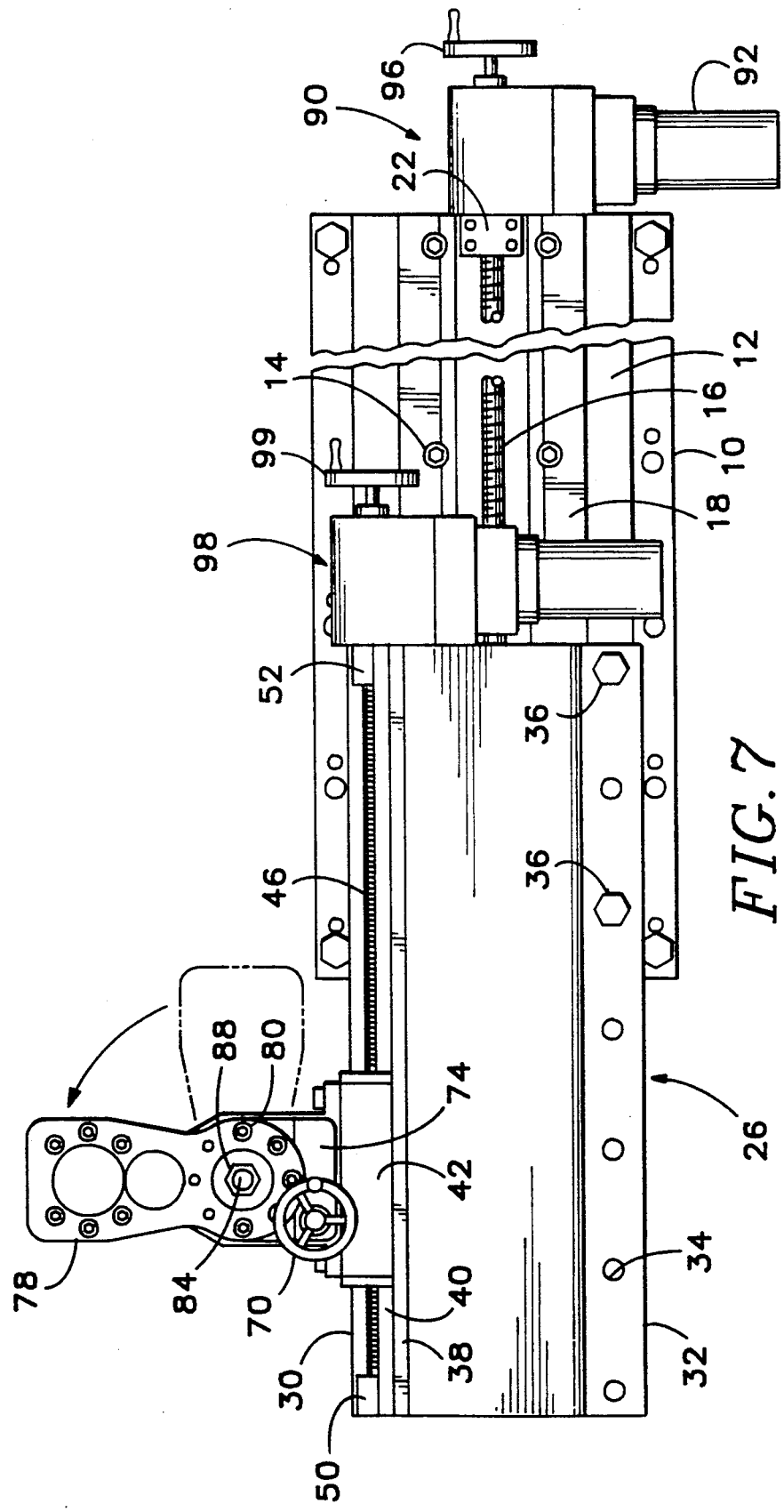
FIG. 7 is a top view of the machine tool according to the present invention illustrating mounting of the ram in a direction parallel to the bed of the machine tool.

Because of limitations of space in machining operations, it is also sometimes desirable to remount spindle gear box 78 and motor 82 in selectable noninterfering positions. Thus, the gear box 78 illustrated in FIG. 7 is shown extending outwardly from saddle member 42. This repositioning is sometimes desirable so as not to interfere with possible surrounding machinery as the milling cutter traverses along ram 26. The gear box 78 is mountable at 90 degree increments with respect to the axis of quill 62.

In some cases it may be desired that the milling cutter 68 traverse along the "right" side of the ram 26 rather than along the "left" side as depicted in FIGS. 1-4, for example when it is required to machine a surface located completely at the right hand end of the bed plate. This can be accomplished in effect by rotating ram 26 end-for-end, i.e., through 180 degrees, after removing bolts 36, upraising the ram, and reversing its direction of mounting whereby the spindle unit 44 is disposed toward the right end of a bed 12. This arrangement is depicted in FIG. 5. It can also be desirable in such case to mount feed assembly 90 at the opposite end of the bed to avoid interference.

Moreover, the ram 26 is mountable in a plurality of different cantilevered locations as shown in the drawings so that the cantilevered part thereof may extend completely to one side or the other of the bed plate. The ram is mounted centrally in FIGS. 1 and 2. In FIG. 4, the rearward end of the ram 26 is aligned with the rearward side of carriage block on which it is mounted, with the last holes 34 being engaged by bolts 36 for causing the ram to be cantilevered entirely outwardly in a forward direction. The ram 26 is shown cantilevered entirely rearwardly in FIGS. 3 and 5. A surface 109 is illustrated as being machined in FIG. 3.

Furthermore, the ram can be mounted in a direction substantially lengthways of the bed plate in the manner illustrated in FIG. 7. The bolts 36 in carriage block 24 are arranged in a pattern circumscribing a square enabling the ram to be repositioned lengthways and cantilevered at one end of the bed plate for machining outboard of one end of the bed plate, i.e., the left end in FIG. 7.

Other mounting combinations are also possible. For instance, the spindle unit 44 can be rotated 90 degrees from the downward direction illustrated in FIG. 1 whereby the centerline of quill 62 extends horizontally, i.e., parallel to the axis of lead screw 46. Such position can be suitable for drilling purposes wherein tool 68 is replaced with a drill bit. The holes for screws 58 and saddle member 42 circumscribe a square pattern allowing multiple mounting directions. The motor 92 can also be mounted on the reverse (e.g. upper) side of gear box 78 as illustrated in dashed lines in FIG. 3.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A machine tool adapted for attachment in the field to a component of structure to be machined, said machine tool comprising:
   a demountable elongated bed adapted for mounting on a horizontal surface of said structure,
   a ram member slidable in a first direction along said bed, said ram member being disposed normally crossways of said bed and extendible in cantilevered relation outwardly of said bed in a second direction substantially perpendicular to said first direction, said ram member having at least one side extending crossways of said bed substantially perpendicular to said bed,
   drive means for moving said ram member in said first direction, and
   a spindle unit for carrying and operatively driving a machining tool, said spindle unit being slidably mounted on the side of said ram member for positioning in said second direction along said ram member across and outwardly of said bed, said spindle unit including feed means for translating said machining tool in a third direction.

2. The machine tool according to claim 1 wherein said spindle unit is also rotatably repositionable about an axis parallel to said first direction causing said third direction to have a selected angular relation to said second direction.

3. The machine tool according to claim 1 wherein said ram member is fixedly movable in said second direction to a plurality of selectable positions cantilevered outwardly with respect to said bed.

4. The machine tool according to claim 3 wherein said ram member is additionally reversibly mountable across said bed for causing the spindle unit to be slidable on the relatively opposite side of said ram with respect to a fixed location on said bed.

5. The machine tool according to claim 3 wherein said ram member is additionally mountable in a direction lengthways of said bed for extending in cantilevered relation from an end of said bed.

6. The machine tool according to claim 1 wherein said means for translating said machining tool in said third direction comprises a quill clamp for slidable mounting on said side of said ram member, and a quill received in said quill clamp for carrying said machining tool, including means for adjustably positioning said quill with respect to said quill clamp, and torque means attached to said quill outboard of the axis of said quill, said torque means being slidably received in said quill clamp.

7. A machine tool adapted for attachment in the field to a component of structure to be machined, said machine tool comprising:
   a demountable elongated bed adapted for mounting on a horizontal surface of said structure,
   a spindle unit for carrying and operatively driving a rotatable machining tool,
   a ram member slidable in a first direction along said bed, said ram member being disposed normally crossways of said bed and removably extendible in cantilevered relation outwardly of said bed in a second direction substantially perpendicular to said first direction by a distance at least equal to the dimension of said spindle unit in said second direction to selectively support said spindle unit in cantilevered outward relation to said bed, and
   drive means for moving said ram member in said first direction,
   said spindle unit being slidably mounted on said ram member for continuous selective positioning in said second direction along the length of said ram member and across said bed, said spindle unit including feed means for translating said machining tool in a third direction axially of said spindle unit.

8. The machine tool according to claim 7 wherein said spindle unit is also rotatably repositionable about an axis parallel to said first direction causing said third direction to have a selected angular relation to said second direction.

9. The machine tool according to claim 7 wherein said ram member is removably mountable in a plurality of selectable positions cantilevered outwardly to a selected extent with respect to said bed.

10. The machine tool according to claim 9 wherein said ram member is additionally mountable in a direction lengthways of said bed for extending in cantilevered relation from an end of said bed.

11. The machine tool according to claim 7 wherein said ram member has at least one side and wherein said spindle unit is slidably mounted on said ram member by means of slide means located at said side of said ram member.

12. A machine tool adapted for attachment in the field to a component of structure to be machined, said machine tool comprising:
   a demountable elongated bed adapted for mounting on a horizontal surface, said bed having first, normally horizontally disposed guideways located therealong,
   a carriage block movably positionable upon said first guideways,
   drive means for moving said carriage block along said first guideways,
   a ram member affixed to said carriage block in crossways relation to said bed, said ram member having a side and having second guideways extending crossways of said bed and located on said side of said ram member,
   a spindle assembly for carrying a rotatable machining tool, said spindle assembly being provided with a saddle member for mounting said spindle assembly at the side of said ram member while being disposed in mating relation with said second guideways,
   means for moving said spindle assembly along said second guideways in a direction crossways of said bed substantially completely across said bed, and
   means for feeding said machining tool in the direction of the rotational axis of said machining tool.

13. The machine tool according to claim 12 wherein said spindle assembly is positionable laterally with respect to said saddle member.

14. The machine tool according to claim 12 including means for mounting said spindle assembly in selected angular relation with respect to said saddle member.

15. The machine tool according to claim 12 wherein said ram member is removably mountable on said carriage block in a plurality of selectable positions cantilevered outwardly with respect to said bed.

16. A machine tool adapted for attachment in the field to a component of structure to be machined, said machine tool comprising:
   an elongated bed adapted for mounting on a horizontal surface, said bed having first, normally horizontal disposed guideways located therealong,
   a carriage block positionable upon said first guideways,
   a ram member movably affixed to said carriage block in crossways, cantilevered relation to said bed, said ram member being mountable on said carriage block in a plurality of selectable positions cantilevered outward with respect to said bed, said ram member having second guideways located crossways of said bed,
   a spindle assembly for carrying a machining tool, said spindle assembly being provided with a saddle member disposed in mating relation with said second guideways,
   means for moving said spindle assembly along said second guideways across said bed, and
   means for feeding said machining tool in the direction of the rotational axis of said machining tool,
   said second guideways extending beyond said bed by a distance greater than the length of said saddle member along said second guideways whereby said slide member carrying said spindle assembly is positionable outboard of said bed.

17. The machine tool according to claim 16 wherein said spindle assembly is positionable laterally with respect to said saddle member.

18. The machine tool according to claim 16 including means for mounting said spindle assembly in selected angular relation with respect to said saddle member.

* * * * *